UNITED STATES PATENT OFFICE.

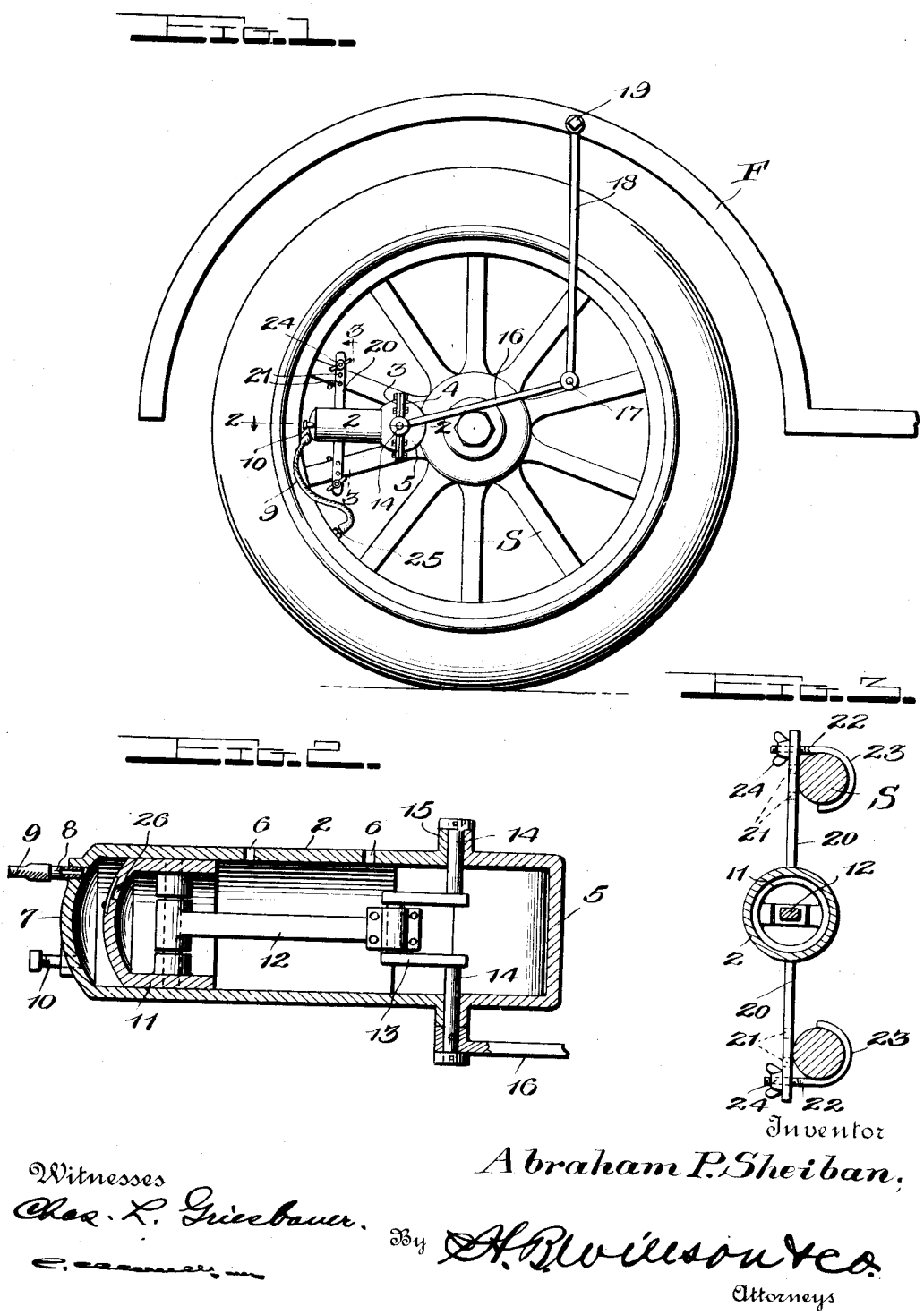

ABRAHAM P. SHEIBAN, OF FALL RIVER, MASSACHUSETTS.

INFLATING DEVICE.

1,182,428. Specification of Letters Patent. Patented May 9, 1916.

Application filed September 20, 1915. Serial No. 51,706.

*To all whom it may concern:*

Be it known that I, ABRAHAM P. SHEIBAN, a citizen of the United States, residing at Fall River, in the county of Bristol and State of Massachusetts, have invented certain new and useful Improvements in Inflating Devices; and I do declare the following to be a full, clear, and exact description of the invention, such as will enable others skilled in the art to which it appertains to make and use the same.

This invention relates to inflating devices for pneumatic tires and has for one purpose to provide means for automatically inflating pneumatic vehicle tires while the same are running over the road.

A further object is to provide a device of this character which may be quickly and easily attached to any automobile or other vehicle wheel by my improved clamping device.

A still further object is to provide an inflating device of this character which will warn the driver of the vehicle that the tire has been sufficiently inflated when the pressure in said tire reaches a certain point.

With the above and many other objects in view, my invention resides in the novel features of construction and arrangement of parts which will be set forth hereinafter in the description and claims.

In the accompanying drawing: Figure 1 represents a portion of a vehicle showing my improved inflating device applied to one rear wheel thereof; Fig. 2 is a horizontal longitudinal section taken on the line 2—2 of Fig. 1, and Fig. 3 is a vertical transverse section taken on the line 3—3 of Fig. 1.

In the preferred form of my invention, the pump 1 used for inflating the pneumatic tires is adapted to be positioned on the vehicle wheel intermediately of the hub and rim thereof, and is designed to extend radially from said hub as shown in Fig. 1. The pump as best disclosed in Fig. 2 comprises a cylinder 2 whose inner end is flanged as shown at 3 and adapted to contact with similar flanges 4 formed around the edge of the crank case 5, said crank case being secured to the cylinder 2 in the usual manner. The wall of the cylinder 2 is provided with one or more air inlets 6, while the head 7 thereof which is preferably bulged outwardly as shown, has a pair of apertures formed therethrough one of which is adapted to receive a short threaded tube 8 on which is placed a flexible tubing 9, while the other opening receives a blow-off or other safety valve 10. This blow-off valve 10 will become active when the pressure in the tire has been raised to a sufficient extent and allow the escape of compressed air from the cylinder, thus notifying the driver of a vehicle that the tire has become sufficiently inflated and that my improved inflating device may be removed or disconnected from the tire.

Disposed for reciprocation in the cylinder 2 is the usual piston 11 connected by a piston rod 12 to a crank 13 of the usual construction, the shaft 14 of this crank being mounted in suitable bearings 15 formed in the cylinder 2 and the crank case 5. One end of this crank shaft 14 is extended beyond one of its bearings 15 and has on one end an additional crank arm 16 fixed thereto.

From the foregoing, it will be seen that as the crank 16 is fixed to the crank shaft 14 which carries the crank 13, the piston will be reciprocated when said crank 16 is rotated. The opposite end of the crank arm 16 is pivotally connected at 17 to one end of a connecting rod 18, the opposite end of which is pivoted at 19 to the fender F of the vehicle.

In order to secure the pump 1 to the vehicle wheel, I preferably provide the laterally extending arms 20 which project at right angles from diametrically opposite points on the outer wall of the cylinder 2 adjacent the head 7 thereof. I preferably cast these arms 20 integrally with the cylinder 2 as shown. The free ends of these arms 20 are apertured as shown at 21 to receive the threaded end 22 of the clip 23 which is preferably U-shaped with the threaded end extended beyond the other arm of the U. I provide two of these clips, one for each of the arms 20, said clips being adapted to extend around the adjacent spokes S of the vehicle wheel in order to clamp the pump to said wheel. Wing or other preferred form of nuts 24 are threaded on the ends of the arms 22 after said threaded ends have been passed through the openings 21 in the arms 20. By tightening these nuts 24, it is evident that the spokes S will be tightly clamped between the U-shaped clips 23 and the arms 20 as shown in Fig. 3. A series of openings 21 is provided in each of the arms 20 to allow the device to be used on automobile or other vehicle wheels of various sizes having the spokes spaced at various distances apart.

In operation, the connecting rod 18 oscillates on its pivot 19 and the crank arm 16 connected therewith remains in a substantially right angular position thereto irrespective of the position of the pump 1. Thus it will be seen that the connecting rod 18 and the crank arm 16 form a substantially right angular rod connecting the piston with the body of the vehicle, even though the parts thereof are pivoted at 17.

When it is desired to inflate a pneumatic tire, the pump is placed on the vehicle wheel and secured thereto by means of the U-shaped clips 23, and the connecting rod 18 is pivoted at 19 to the fender of the vehicle as shown in Fig. 1. The free end of the flexible tubing 9 is connected to the valve stem 25 of the tire, and the air which is compressed in the cylinder 2 can be forced into said tire, the valve in said stem preventing the air from leaving the tire. This valve stem 25 with its valve is constructed similarly to the ordinary tire valve now commonly in use. It is evident that on the compression stroke of the piston 11, air is drawn into the cylinder 2 through one of its ports 6 and that on the return stroke this air passes through the valve 26 in the head of the piston 11, said air being compressed when the piston again moves toward the head 7 of the cylinder and forced through the tube 9 to the tire. This pumping action may be performed either by rotating the wheel by hand when the machine is jacked up, or by running the vehicle along the road, or by disconnecting the crank arm 16 from the connecting rod 18 and rotating said crank arm to reciprocate the piston. When the pressure of the air in the tire has risen to a sufficient amount, the safety valve 10 will signal the operator that the inflating device may be removed and placed on another wheel.

From the foregoing description, taken in connection with the accompanying drawing, it is obvious that I have produced a novel device by means of which the air pressure in a tire may be kept to a desired height even though there is a leak or puncture in said tire, because of the automatic action of said inflating device.

I claim:

1. In an inflating device, a pump comprising a cylinder, a piston therefor, a crank shaft connected with said piston, a crank on the outer end of said crank shaft, means for mounting said pump on a vehicle wheel, and a connecting rod for connecting the free end of said crank arm with the body of a vehicle.

2. In an inflating device, a pump comprising a cylinder, a piston therefor, a crank shaft connected with said piston, a crank arm on the outer end of said crank shaft, means for mounting said pump on a vehicle wheel, and an oscillating rod connecting the free end of said crank arm with the body of a vehicle.

3. In an inflating device, a pump comprising a cylinder, a piston therefor, a crank shaft connected with said piston, a crank arm on the outer end of said crank shaft, means for mounting said pump on a vehicle wheel, a connecting rod pivoted by one end to the free end of said crank arm, its opposite end being apertured, and a pivot pin for pivoting the apertured end of said rod to the body of the vehicle.

In testimony whereof I have hereunto set my hand in presence of two subscribing witnesses.

ABRAHAM P. SHEIBAN.

Witnesses:
 NAHAM J. JABBOUR,
 SALEEM A. MIKOOL.